US009692495B2

(12) United States Patent
Geirhofer et al.

(10) Patent No.: US 9,692,495 B2
(45) Date of Patent: Jun. 27, 2017

(54) CONTROL CHANNEL OVERHEAD ASSUMPTIONS FOR DERIVING CSI FEEDBACK

(71) Applicant: QUALCOMM Incorporated, San Diego, CA (US)

(72) Inventors: Stefan Geirhofer, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 14/226,459

(22) Filed: Mar. 26, 2014

(65) Prior Publication Data

US 2014/0301293 A1  Oct. 9, 2014

Related U.S. Application Data

(60) Provisional application No. 61/809,129, filed on Apr. 5, 2013.

(51) Int. Cl.
| | |
|---|---|
| *H04W 72/04* | (2009.01) |
| *H04W 72/00* | (2009.01) |
| *H04W 8/00* | (2009.01) |
| *H04B 7/06* | (2006.01) |
| *H04L 1/00* | (2006.01) |

(52) U.S. Cl.
CPC ......... *H04B 7/0626* (2013.01); *H04L 1/0026* (2013.01); *H04L 1/0039* (2013.01)

(58) Field of Classification Search
CPC .......................... H04B 7/0626; H04W 72/0446
USPC ........................................................ 370/208
See application file for complete search history.

(56) References Cited

U.S. PATENT DOCUMENTS

| | | | | |
|---|---|---|---|---|
| 2006/0221887 A1* | 10/2006 | Newberg | ............... | H04W 48/12 370/328 |
| 2010/0120442 A1* | 5/2010 | Zhuang | ............... | H04B 7/15507 455/450 |
| 2011/0002293 A1* | 1/2011 | Yuk | .................... | H04W 72/0406 370/329 |
| 2011/0261768 A1* | 10/2011 | Luo | ......................... | H04L 5/001 370/329 |
| 2012/0252447 A1 | 10/2012 | Sartori et al. | | |

(Continued)

FOREIGN PATENT DOCUMENTS

WO  WO-2012146307 A1  11/2012

OTHER PUBLICATIONS

International Search Report and Written Opinion—PCT/US2014/032160—ISA/EPO—Jul. 22, 2014.

(Continued)

*Primary Examiner* — Asad Nawaz
*Assistant Examiner* — Jason Harley
(74) *Attorney, Agent, or Firm* — Norton Rose Fulbright US LLP (57) ABSTRACT

Determination of channel state information (CSI) feedback by mobile devices is disclosed in which the mobile device receives one or more configuration parameters, that may include one or more control channel parameters for configuring a mobile device control channel. The UE uses the configuration parameters to determine an assumption of overhead resources. Using this overhead assumption, the mobile device derives the CSI index and transmits the CSI index to a serving base station.

32 Claims, 5 Drawing Sheets

(56) References Cited

U.S. PATENT DOCUMENTS

| | | | |
|---|---|---|---|
| 2013/0083753 A1 | 4/2013 | Lee et al. | |
| 2013/0136065 A1* | 5/2013 | Chen | H04B 7/0645 370/329 |
| 2013/0148515 A1 | 6/2013 | Ribeiro et al. | |
| 2013/0235839 A1* | 9/2013 | Kim | H04L 5/0092 370/329 |
| 2013/0322376 A1* | 12/2013 | Marinier | H04W 72/06 370/329 |
| 2013/0329661 A1 | 12/2013 | Chen et al. | |
| 2014/0314041 A1* | 10/2014 | Kim | H04L 5/0048 370/329 |

OTHER PUBLICATIONS

Intel Corporation : "Corrections to UE assumptions for deriving CQI index", 3GPP Draft; R1-130070 Corrections to UE Assumptions for Deriving CQI Index, 3rd Generation Partnership Project (3GPP), Mobile Competence Centre ; 650, Route Deslucioles; F-06921 Sophia-Antipolis CED, vol. RAN WG1, No. St. Julian; 20130128-20130201 Jan. 19, 2013 (Jan. 19, 2013), XP050663518, Retrieved from the Internet: URL:http://www.3gpp.org/ftp/tsg_ran/WG1_RL1/TSGR1_72/Docs/ [retrieved on Jan. 19, 2013].

Renesas Mobile Europe LTD: "Details of CRS rate matching and quasi-colocation signaling", 3GPP Draft; R1-124392, 3rd Generation Partnership Project (3GPP), Mobile Competence Centre ; 650, Route Deslucioles ; F-06921 Sophia-Antipolis Cedex; France vol. RAN WG1, No. San Diego, USA; 20121008-20121012, Sep. 29, 2012 (Sep. 29, 2012), XP050662288, pp. 1-4.

Renesas Mobile Europe LTD: "On CQI definition", 3GPP Draft; R1-124395, 3rd Generation Partnership Project (3GPP), Mobile Competence Centre; 650, Route Des Lucioles; F-06921 Sophia-Antipolis Cedex; France, vol. RAN WG1, No. San Diego, USA; 20121008-20121012 Sep 29, 2012 (Sep. 29, 2012), XP050662291.

Samsung : "CRS RE assumption for TM10 CSI reporting", 3GPP Draft; R1-130275-CRS_RE_ASSUMPTIONS_FOR_TM10_CSI_REPORTING, 3rd Generation Partnership Project (3GPP), Mobile Competence Centre; 650, Route Des Lucioles; F-06921 Sophia-Antipolis Cedex; France, vol. RAN WG1, No. St Julian; 20130128-20130201 Jan. 19, 2013 (Jan. 19, 2013), XP050663621, Retrieved from the Internet: URL:http://www.3gpp.org/ftp/tsg_ran/WG1_RL1/TSGR1_72/Docs/.

3GPP TSG-RAN1: 3GPP Self-evaluation Methodology and Results, "Assumptions" Tetsushi Abe, NTT DOCOMO, 3GPP LTE-Advanced Evaluation Workshop, Dec. 17-18, 2009, 52 pages.

* cited by examiner

CONTROL CHANNEL OVERHEAD ASSUMPTIONS FOR DERIVING CSI FEEDBACK

CROSS-REFERENCE TO RELATED APPLICATIONS

This application claims the benefit of U.S. Provisional Patent Application No. 61/809,129, entitled, "CONTROL CHANNEL OVERHEAD ASSUMPTIONS FOR DERIVING CSI FEEDBACK", filed on Apr. 5, 2013, which is expressly incorporated by reference herein in its entirety.

BACKGROUND

Field

Aspects of the present disclosure relate generally to wireless communication systems, and more particularly, to control channel overhead assumptions for deriving channel state information (CSI) feedback.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes receiving, by a mobile device, one or more configuration parameters, comprising one or more control channel parameters for configuration of a control channel for the mobile device, determining, by the mobile device, an overhead assumption based, at least in part, on the one or more configuration parameters, deriving a channel state indicator (CSI) index based on the overhead assumption, and transmitting the CSI index to a serving base station.

In an additional aspect of the disclosure, an apparatus configured for wireless communication that includes means for receiving, by a mobile device, one or more configuration parameters, comprising one or more control channel parameters for configuration of a control channel for the mobile device, means for determining, by the mobile device, an overhead assumption based, at least in part, on the one or more configuration parameters, means for deriving a CSI index based on the overhead assumption, and means for transmitting the CSI index to a serving base station.

In an additional aspect of the disclosure, a computer program product has a computer-readable medium having program code recorded thereon. This program code includes code for causing a computer to receive, by a mobile device, one or more configuration parameters, comprising one or more control channel parameters for configuration of a control channel for the mobile device, code for causing a computer to determine, by the mobile device, an overhead assumption based, at least in part, on the one or more configuration parameters, code for causing a computer to derive a CSI index based on the overhead assumption, and code for causing a computer to transmit the CSI index to a serving base station.

In an additional aspect of the disclosure, an apparatus includes at least one processor and a memory coupled to the processor. The processor is configured to receive, by a mobile device, one or more configuration parameters, comprising one or more control channel parameters for configuration of a control channel for the mobile device, to determine, by the mobile device, an overhead assumption based, at least in part, on the one or more configuration parameters, to derive a CSI index based on the overhead assumption, and to transmit the CSI index to a serving base station.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
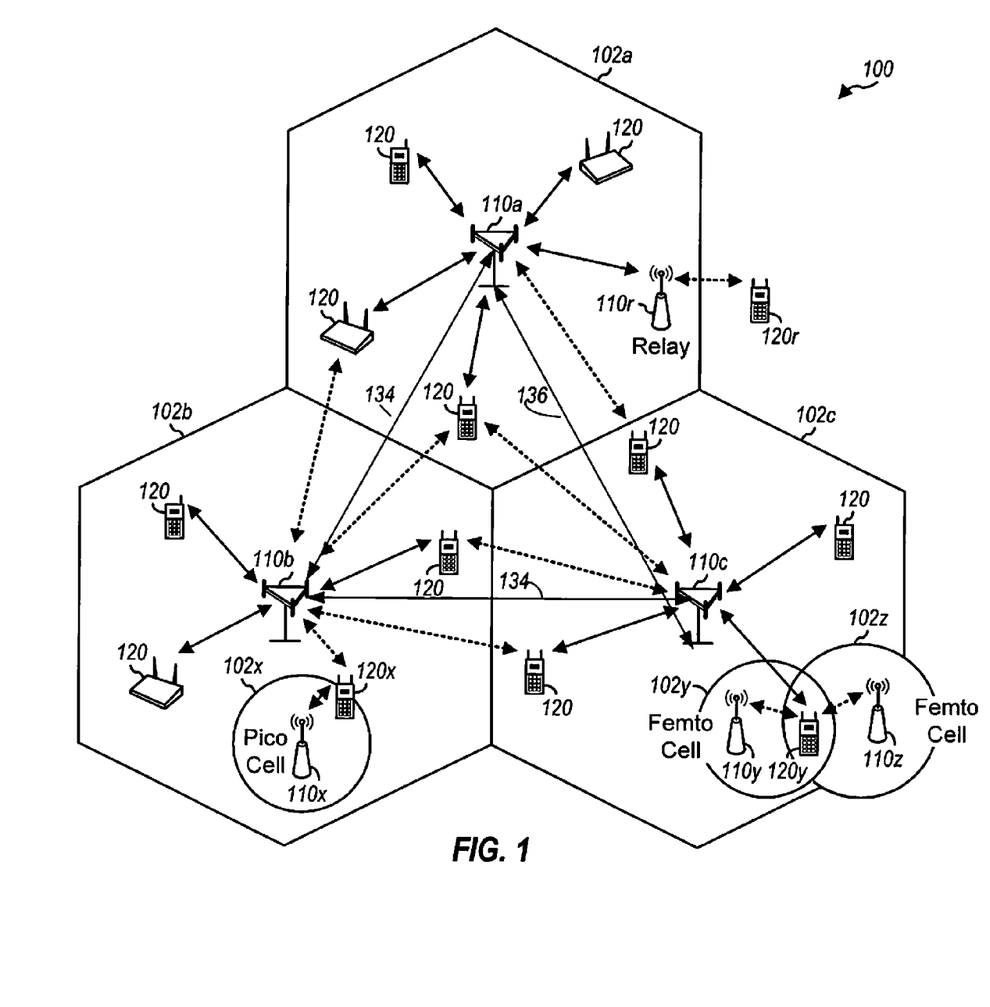
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110*a*, 110*b* and 110*c* are macro eNBs for the macro cells 102*a*, 102*b* and 102*c*, respectively. The eNB 110*x* is a pico eNB for a pico cell 102*x*. And, the eNBs 110*y* and 110*z* are femto eNBs for the femto cells 102*y* and 102*z*, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
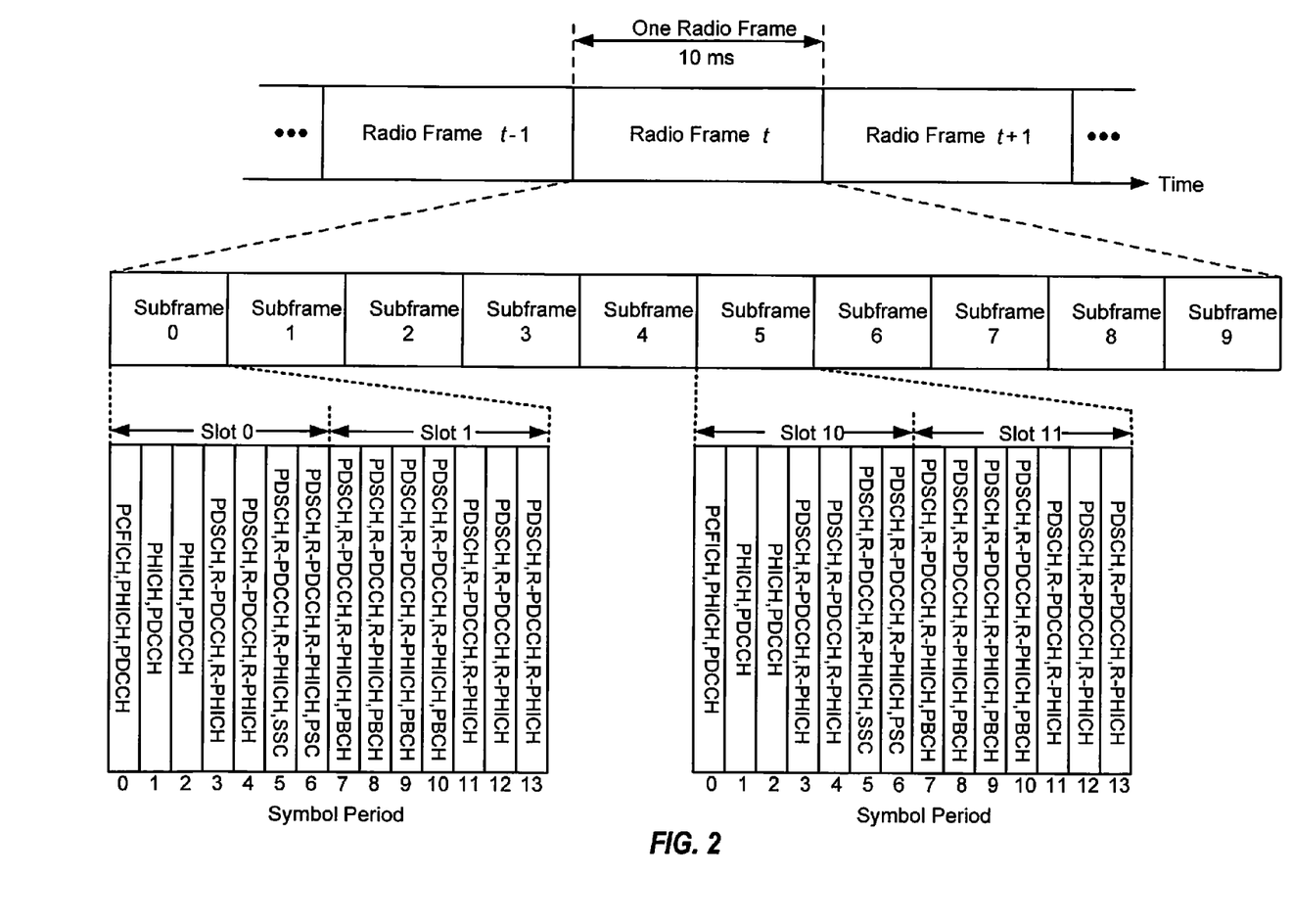
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
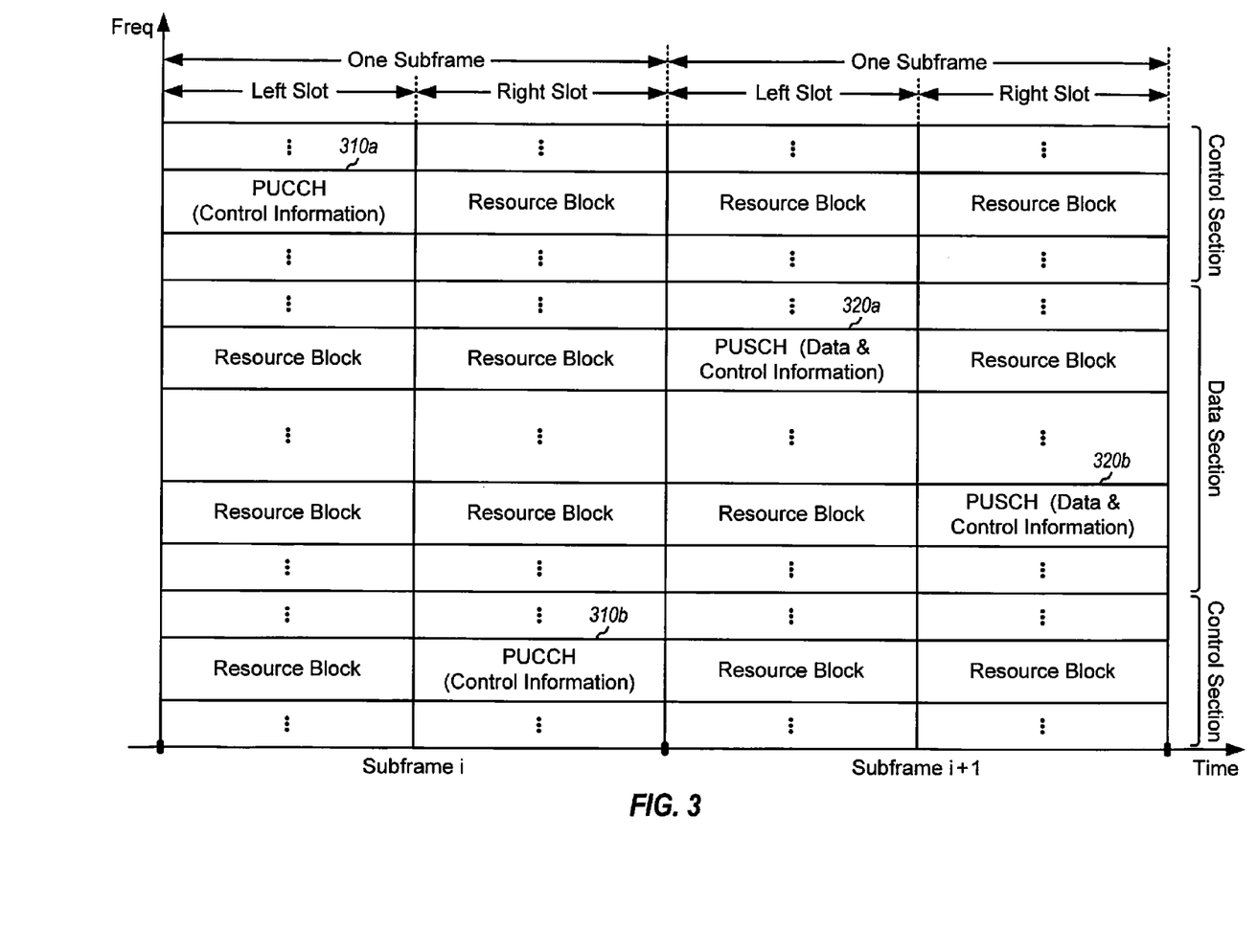
FIG. 3 is a block diagram conceptually illustrating an exemplary frame structure in uplink LTE/-A communications.

FIG. 3 is a block diagram illustrating an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310a and 310b in the control section. The UE may transmit only data or both data and control information in a Physical Uplink Shared Channel (PUSCH) on the assigned resource blocks 320a and 320b in the data section. An uplink transmission may span both slots of a subframe and may hop across frequency as shown in FIG. 3.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x, which generally transmits at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as cell range extension (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with cell range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c (as shown in FIG. 1) or to the femto eNB 110z also with lower received power (not shown in FIG. 1). The UE 120y may then observe high interference from the femto eNB 110y on the downlink and may also cause high interference to the eNB 110y on the uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 μs (5 km÷3×10$^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 4:
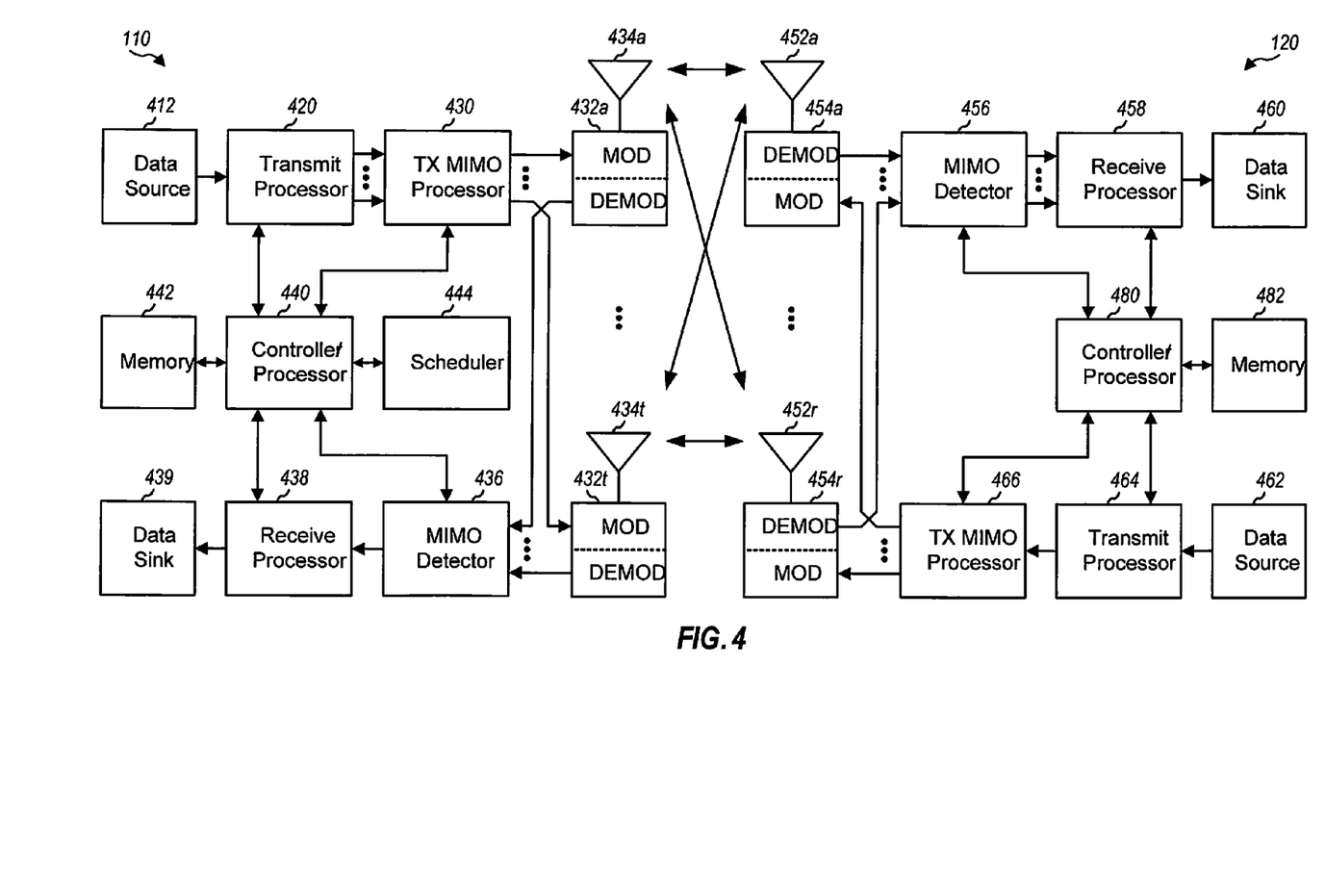
FIG. 4 is a block diagram conceptually illustrating a design of a base station/eNB and a UE configured according to one aspect of the present disclosure.

FIG. 4 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 434a through 434t, and the UE 120 may be equipped with antennas 452a through 452r.

At the eNB 110, a transmit processor 420 may receive data from a data source 412 and control information from a controller/processor 440. The control information may be for the PBCH, PCFICH, PHICH, PDCCH, etc. The data may be for the PDSCH, etc. The transmit processor 420 may process (e.g., encode and symbol map) the data and control information to obtain data symbols and control symbols, respectively. The transmit processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the eNB 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 110. At the eNB 110, the uplink signals from the UE 120 may be received by the antennas 434, processed by the modulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440.

The controllers/processors 440 and 480 may direct the operation at the eNB 110 and the UE 120, respectively. The controller/processor 440 and/or other processors and modules at the eNB 110 may perform or direct the execution of various processes for the techniques described herein. The controllers/processor 480 and/or other processors and modules at the UE 120 may also perform or direct the execution of the functional blocks illustrated in FIG. 5, and/or other processes for the techniques described herein. The memories 442 and 482 may store data and program codes for the eNB 110 and the UE 120, respectively. A scheduler 444 may schedule UEs for data transmission on the downlink and/or uplink.

As a UE operates in any given environment, the channel conditions will change that the UE experiences. The changing channel conditions will impact the performance of the UE and, as such, the signaling from the serving base stations should also change to accommodate the changing channel conditions in order to more efficiently support communications with and to the UE. One tool that is used for managing the communication parameters between the UE and the serving base stations is reporting of channel state information (CSI) feedback. The UE measures and estimates CSI feedback and reports the results to the base stations that may then select the appropriate communication parameters, such as the modulation coding scheme (MCS), and the like, to accommodate the current conditions.

CSI feedback in LTE generally includes a rank indicators (RIs), a precoding matrix indicators (PMIs), and a channel quality indicators (CQIs). An RI corresponds to the number of useful transmission layers for spatial multiplexing (based on the UE's estimate of the downlink channel), enabling the eNB to adapt the PDSCH transmissions accordingly. A PMI corresponds to the index of the precoder (within a codebook shared by the UE and eNB) that maximizes the aggregate number of data bits that could be received across all downlink spatial transmission layers and generally corresponds to the RI value in the codebook. For some antenna configuration, the PMI may be composed of a first PMI and a second PMI, respectively (e.g., when a dual codebook structure is used). A CQI typically informs the network of the channel quality per codeword, conditioned on the RI and PMI information, such as to support MCS selection at the network side.

Under current standards, the CQI values are determined in order to satisfy the following constraint: A single PDSCH transport block with a combination of modulation scheme and transport block size corresponding to the CQI index, and occupying a group of downlink physical resource blocks termed the CSI reference resource, could be received with a transport block error probability not exceeding 0.1. Thus, a CQI index value should result in no more than a 10% block error rate (BLER). In selected aspects, when RI/PMI feedback is not configured (e.g., in TDD), a UE will still report CQI.

In general, LTE supports two types of CSI feedback: periodic and aperiodic. Aperiodic CQI feedback may be performed on a per-request basis. It may be triggered by the network through a grant on PDCCH and reported via the PUSCH. Therefore, the CQI report may support higher payload transmissions. Various reporting modes for CQI are defined that target different performance/overhead tradeoffs. In periodic CQI feedback, various reporting modes are defined in the current specification (e.g., PUCCH 1-1, PUCCH 2-1, etc.). The periodic CQI reporting follows a specific timeline that may be configured semi-statically. Periodic CQI is carried on the uplink control channel, such as the physical uplink control channel (PUCCH), which has a more limited payload. RI/PMI/CQI feedback may be in various different formats. For example, depending on the specific reporting mode, PMI and/or CQI may be reported on a wideband or subband basis. If reported on a subband basis, the CQI may reflect the channel conditions on the corresponding subband only.

In order to compute the CQI index that satisfies the aforementioned constraints, a UE makes an assumption of the resource overhead. Resource elements (REs) occupied by channels other than PDSCH or occupied by reference signals are not generally available for downlink transmission. Therefore, the CQI value indicated by a UE will typically decrease as the system overhead assumption increases, because the BLER is generally related to the number of REs available for PDSCH reception. The UE only makes this the system overhead assumption for purpose of CSI feedback. For an actual transmission, the network is free to configure/transmit channels according to a different overhead assumption entirely. In such a case, the network may adjust the MCS selection by taking into account that the CQI reported by the UE was computed under a different set of overhead assumptions. In practice, it is often desirable for the UE's overhead assumption to be aligned as closely as possible with the network's overhead assumption. This alignment can mitigate errors made by the network when adjusting the CQI for MCS selection.

Under the current standards, overhead assumptions include assumptions that the first three OFDM symbols are occupied by control signaling (legacy PDCCH), assumptions that no REs are used for PSS/SSS or PBCH, assumptions that the cyclic prefix (CP) length corresponds to non-multicast-broadcast single frequency network (MBSFN) subframes, assumptions that the redundancy version is 0, assumptions that no REs are used for non-zero-power (NZP) CSI-RS or zero-power (ZP) CSI-RS, assumptions that no REs are allocated for positioning reference signals (PRS), assumptions that no REs are used for enhanced PDCCH (EPDCCH), and the like. This assumption of no EPDCCH overhead may become an issue as future releases may not include the legacy PDCCH.

The introduction of EPDCCH was influenced by multiple considerations, including coordinated multipoint (CoMP) technologies, downlink MIMO enhancements, further enhanced inter-cell interference coordination (ICIC), and potential future new carrier types. EPDCCH is FDM based. In current implementations, EPDCCH coexists with legacy PDCCH (TDM control channel). However, future implementations may provide for EPDCCH to be the only control channel without legacy PDCCH.

EPDCCH supports two operation modes: localized and distributed EPDCCH. In localized EPDCCH, a single precoder is applied for each PRB pair. This localized EPDCCH may be used in beamforming for a single UE. In distributed EPDCCH, two precoders cycle through the allocated resources within each PRB pair. A UE may be configured with up to two EPDCCH resource sets, where each resource set may be separately configured with 2, 4, or 8 PRB pairs or separately configured with either localized or distributed mode.

In certain circumstances, it may be beneficial to test a UE's overhead assumption for CQI computation, such as to verify proper operation of the UE. In order to test the CQI computation constraint, it may be desirable to define the UE's overhead reporting assumption such that it corresponds to a feasible downlink transmission configuration. For example, in a circumstance in which control data is transmitted via legacy PDCCH, the UE assumes three control symbols occupied by PDCCH. In an actual transmission, this assumption can easily be realized by the network. Because such control data may be delivered using PDCCH, a non-zero EPDCCH overhead assumption is clearly supportable. In a different circumstance, in which legacy PDCCH are absent, the network would be unable to deliver a downlink grant without consuming REs for this control transmission.

At the same time, it may be desirable that the UE's overhead reporting assumption is aligned closely with the actual overhead during downlink transmission, as this may reduce the errors that may arise when the network adjusts the CQI received by the UE for selection of MCS. It may, therefore, be undesirable to, for example, assume that all configured EPDCCH resources, out of which only a subset may be used for actual transmission, should be counted as overhead. This would likely incur performance loss in practice. Various aspects of the present disclosure provide alternatives that allow the UE's overhead reporting assumption to correspond to a feasible downlink transmission configuration, while allowing the UE's overhead reporting assumption to be aligned with the actual overhead during downlink transmissions.

Figure 5:
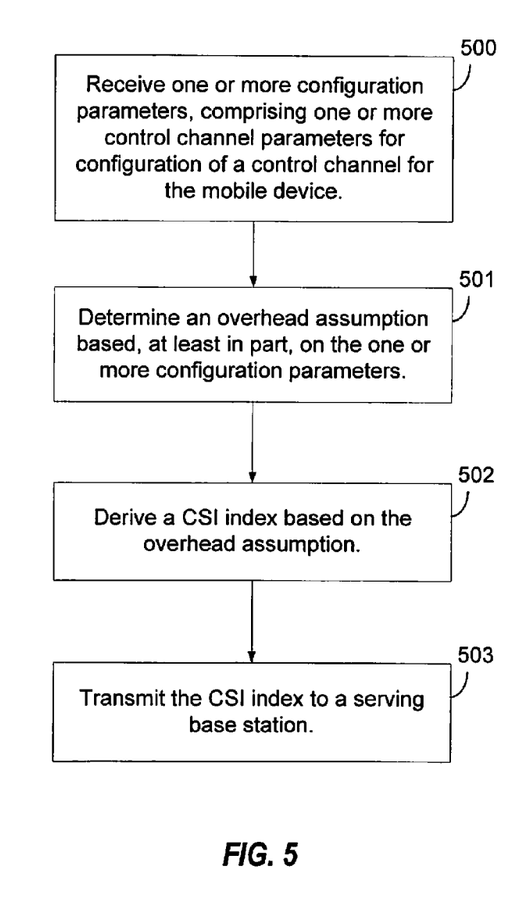
FIG. 5 is a functional block diagram illustrating example blocks executed to implement one aspect of the present disclosure.

According to various aspects of the present disclosure, the UE's EPDCCH overhead assumption depend on one or more configuration parameters, that may include control channel parameters for configuring the control channel. FIG. 5 is a functional block diagram illustrating example blocks executed to implement one aspect of the present disclosure. At block 500, a UE receives one or more configuration parameters, that may include one or more control channel parameters for configuration of a UE control channel. At block 501, the UE determines an overhead assumption based, at least in part, on the configuration parameters.

These configuration parameters may be selected from many different configuration types. For example, the overhead assumption may be EPDCCH set specific. In such an implementation, the UE assumes that only REs belonging to the first or other designated EPDCCH set are accounted as overhead. This particular configuration parameter-based assumption is a testable case, because the network may use only the resources associated with the first set to deliver EPDCCH in a specific test case. This assumption is more realistic from a practicable standpoint as only a portion of the configured EPDCCH resources would be used in practice.

In another example, the overhead assumption differentiates common versus UE-specific search space. While EPDCCH does not currently support a common search space, such search space may be needed for standalone EPDCCH operations (e.g., in the context of new carrier type (NCT)). If common search space is supported, a UE may only account for the common search space in its overhead assumption. This is also a testable case, because the network may send downlink control information (DCI) for the common search space in a specific test case. This assumption is also more realistic, since it avoids counting all EPDCCH resources as overhead.

In another example, the UE assumes that a specific subset of EPDCCH resources is excluded. For example, the UE may assume that only one enhanced control channel element (eCCE) with a specific aggregation level is counted as overhead. The location of the eCCE should be known to the UE. The UE may assume that the eCCE is the one with the lowest frequency starting RE. Other criteria may be considered as long as these criteria are known to both UE and network. Alternatively, the UE may exclude all eCCEs with a certain aggregation level in the UE-specific search space.

In a still further example assumption, a different EPDCCH overhead assumption may be made depending on whether the EPDCCH operates in a localized or distributed mode. Excluding a larger number of resources would generally be more acceptable for distributed EPDCCH rather than for localized EPDCCH. For distributed EPDCCH, although a single UE only occupies a fraction of the configured resources, the remainder may be used by other UEs. Therefore, those resources would not necessarily be available for EPDCCH. For localized-mode EPDCCH, this assumption may not be the case. Thus, in distributed EPDCCH, it may be preferable to exclude a smaller fraction of EPDCCH resources for control overhead.

At block 502, the UE derives a CSI index based on the overhead assumption. Once the appropriate set of resources has been determined based on the configuration parameters, the UE is able to generate the overhead assumption using known information. At block 503, the UE transmits the derived CSI index to a serving base station.

It should be noted that in additional aspects of the present disclosure, an EPDCCH overhead assumption may also be configurable per CSI-process. To facilitate testing, it may suffice to have one CSI process that accounts for EPDCCH overhead. Other CSI processes may be configured without EPDCCH overhead accounting.

An EPDCCH overhead assumption may also depend on whether a component carrier is self- or cross-carrier scheduled. EPDCCH overhead assumption may be aligned with the component carrier for which CSI is intended. For example, consider the case where CSI is provided for a first and second component carrier, where only the first component carrier is configured with EPDCCH. The UE may then make an EPDCCH overhead assumption according to the proposals discussed herein for the first component carrier. In such configurations, the UE may assume zero EPDCCH overhead for the second component carriers, as there are no EPCCH configured for the second component carrier.

Figure 6:
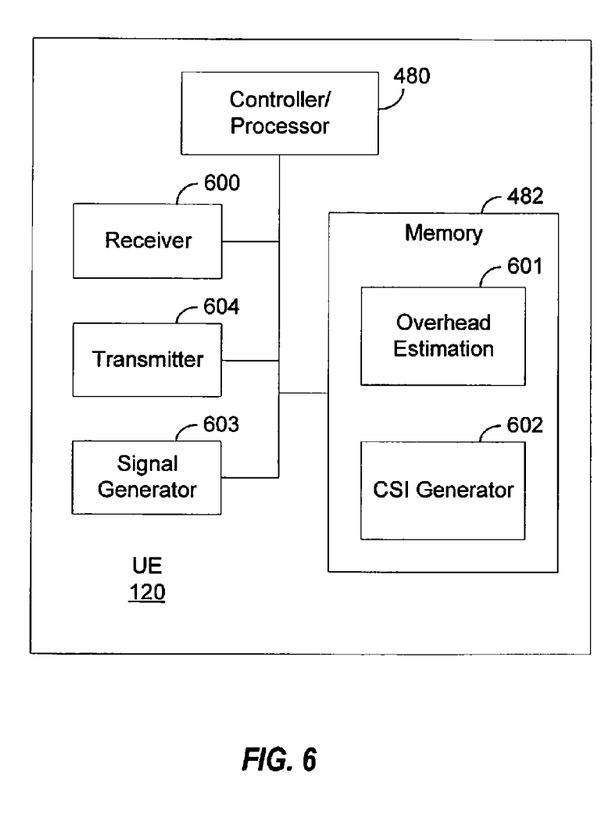
FIG. 6 is a block diagram illustrating a UE configured according to one aspect of the present disclosure.

FIG. 6 is a block diagram illustrating a UE 120 configured according to one aspect of the present disclosure. UE 120 includes controller/processor 480 that controls and executes logic stored in memory 482 to implement the features and functionalities of UE 120. In one aspect of the present disclosure, UE 120 receives configuration parameters from a base station. The configuration parameters may include one or more control channel parameters for configuring a control channel for UE 120. UE 120, under control of controller/processor 480 receives signals via receiver 600 and demodulates the signals to recover the configuration parameters. The combination of these components and acts may provide means for receiving, by a mobile device, one or more configuration parameters, comprising one or more control channel parameters for configuration of a control channel for the mobile device.

Controller/processor 480 executes CSI generator logic 602 stored in memory 482 to begin determining the CSI index that will be reported to the base station. The execution environment of CSI generator logic 602 triggers execution of overhead estimation logic 601, by controller/processor 480. Using the configuration parameters received from the base station, the execution environment of overhead estimation logic 601 determines an overhead estimate based on the configuration parameters. The combination of these components and acts may provide means for determining, by the mobile device, an overhead assumption based, at least in part, on the one or more configuration parameters.

Once the overhead assumption has been determined, the execution environment of CSI generator 602, under control of controller/processor 480 uses the overhead assumption to derive the CSI index. The CSI index will depend on the level of overhead determined by UE 120 using the configuration parameters. The combination of these components and acts may provide means for deriving a CSI index based on the overhead assumption.

Having derived the CSI index, UE 120, under control of controller/processor 480 generates a signal that includes the CSI index using signal generator 603 and transmits the CSI index signal to the base station via transmitter 604. The combination of these components and acts may provide means for transmitting the CSI index to a serving base station.

As noted above, the configuration parameters on which UE 120 bases determination of the overhead assumption may be related to various control channel parameters. For example, the control channel parameters may indicate a configuration of the EPDCCH, such as whether the UE is to assume EPDCCH resources are set specific, common vs. UE-specific search space, excluded based on a particular subset of resources, whether localized or distributed, and the like. Moreover, the control channel parameters may indicate that the resource overhead assumption may be configurable on a per CSI process basis or whether a particular component carrier is self- or cross-scheduled. Additionally, the configuration parameters may include any number of combinations or variations of these implementations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 5 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. A computer-readable storage medium may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, non-transitory connections may properly be included within the definition of computer-readable medium. For example, if the instructions are transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
receiving, by a mobile device, one or more configuration parameters, comprising one or more control channel parameters for configuration of a control channel for the mobile device, wherein the configuration of the control channel designates system resources to be occupied by the control channel, and wherein the one or more configuration parameters include an identification of a subset of the system resources to be occupied by the control channel that are to be excluded from a determination of a resource overhead assumption;
determining, by the mobile device, the overhead assumption based, at least in part, on the one or more configuration parameters, wherein the determining the overhead assumption includes determining a set of resources associated with the control channel, the set of resources excluding the identified subset of the system resources, and wherein the one or more configuration parameters includes an identification of one of:
a localized control channel; and a distributed control channel, wherein the overhead assumption is determined, at least in part, based on the identification;

deriving a channel state indicator (CSI) index based on the overhead assumption; and transmitting the CSI index to a serving base station.

2. The method of claim 1, wherein the one or more configuration parameters includes identification of at least one of a plurality of sets of resources designated for the control channel, wherein the overhead assumption is determined based on the identified at least one of the plurality of sets of resources.

3. The method of claim 1, wherein the one or more configuration parameters includes identification of a search space type associated with a set of resources, wherein the overhead assumption is determined based on the set of resources associated with the identified search space type.

4. The method of claim 3, wherein the search space type includes one of:

a common search space; and a mobile device-specific search space.

5. The method of claim 1, wherein the one or more configuration parameters include a configuration of a plurality of CSI processes, wherein the determining the overhead assumption is performed separately for each of the plurality of CSI processes.

6. The method of claim 1, wherein CSI index includes a channel quality indicator (CQI) index and one or more of: a rank indicator and a precoding matrix indicator (PMI).

7. The method of claim 1, further comprising:

receiving, at the mobile device, carrier configuration information configuring one of a plurality of component carriers, used for communication by the mobile device, for the control channel, wherein the overhead assumption by the mobile device is determined for the one of the plurality of component carriers configured for the control channel.

8. The method of claim 7, wherein the mobile device determines a zero overhead assumption for each of the other of the plurality of components carriers not configured for the control channel.

9. An apparatus configured for wireless communication, comprising:

means for receiving one or more configuration parameters, comprising one or more control channel parameters for configuration of a control channel for the mobile device, wherein the configuration of the control channel designates system resources to be occupied by the control channel, and wherein the one or more configuration parameters include an identification of a subset of the system resources to be occupied by the control channel that are to be excluded from a determination of a resource overhead assumption;

means for determining the overhead assumption based, at least in part, on the one or more configuration parameters, wherein the means for determining the overhead assumption includes means for determining a set of resources associated with the control channel, the set of resources excluding the identified subset of the system resources, and wherein the one or more configuration parameters includes an identification of one of:

a localized control channel; and a distributed control channel, wherein the overhead assumption is determined, at least in part, based on the identification;

means for deriving a channel state indicator (CSI) index based on the overhead assumption; and means for transmitting the CSI index to a serving base station.

10. The apparatus of claim 9, wherein the one or more configuration parameters includes identification of at least one of a plurality of sets of resources designated for the control channel, wherein the overhead assumption is determined based on the identified at least one of the plurality of sets of resources.

11. The apparatus of claim 9, wherein the one or more configuration parameters includes identification of a search space type associated with a set of resources, wherein the overhead assumption is determined based on the set of resources associated with the identified search space type.

12. The apparatus of claim 11, wherein the search space type includes one of:

a common search space; and a mobile device-specific search space.

13. The apparatus of claim 9, wherein the one or more configuration parameters include a configuration of a plurality of CSI processes, wherein the means for determining the overhead assumption are performed separately for each of the plurality of CSI processes.

14. The apparatus of claim 9, wherein CSI index includes a channel quality indicator (CQI) index and one or more of: a rank indicator and a precoding matrix indicator (PMI).

15. The apparatus of claim 9, further comprising: means for receiving, at the mobile device, carrier configuration information configuring one of a plurality of component carriers, used for communication by the mobile device, for the control channel, wherein the overhead assumption by the mobile device is determined for the one of the plurality of component carriers configured for the control channel.

16. The apparatus of claim 15, wherein the mobile device determines a zero overhead assumption for each of the other of the plurality of components carriers not configured for the control channel.

17. A non-transitory computer-readable medium having program code recorded thereon, the program code including:

program code for causing a computer to receive one or more configuration parameters, comprising one or more control channel parameters for configuration of a control channel for the mobile device, wherein the configuration of the control channel designates system resources to be occupied by the control channel, and wherein the one or more configuration parameters include an identification of a subset of the system resources to be occupied by the control channel that are to be excluded from a determination of a resource overhead assumption;

program code for causing a computer to determine the overhead assumption based, at least in part, on the one or more configuration parameters, wherein the program code for causing the computer to determine the overhead assumption includes program code for causing the computer to determine a set of resources associated with the control channel, the set of resources excluding the identified subset of the system resources, and wherein the one or more configuration parameters includes an identification of one of:

a localized control channel; and a distributed control channel, wherein the overhead assumption is determined, at least in part, based on the identification;

program code for causing a computer to derive a channel state indicator (CSI) index based on the overhead assumption; and program code for causing a computer to transmit the CSI index to a serving base station.

18. The non-transitory computer-readable medium of claim 17, wherein the one or more configuration parameters includes identification of at least one of a plurality of sets of resources designated for the control channel, wherein the overhead assumption is determined based on the identified at least one of the plurality of sets of resources.

19. The non-transitory computer-readable medium of claim 17, wherein the one or more configuration parameters includes identification of a search space type associated with a set of resources, wherein the overhead assumption is determined based on the set of resources associated with the identified search space type.

20. The non-transitory computer-readable medium of claim 19, wherein the search space type includes one of: a common search space; and
a mobile device-specific search space.

21. The non-transitory computer-readable medium of claim 17, wherein the one or more configuration parameters include a configuration of a plurality of CSI processes, wherein the program code for causing a computer to determine the overhead assumption is executed separately for each of the plurality of CSI processes.

22. The non-transitory computer-readable medium of claim 17, wherein CSI index includes a channel quality indicator (CQI) index and one or more of: a rank indicator and a precoding matrix indicator (PMI).

23. The non-transitory computer-readable medium of claim 17, further comprising:
program code for causing a computer to receive, at the mobile device, carrier configuration information configuring one of a plurality of component carriers, used for communication by the mobile device, for the control channel, wherein the overhead assumption by the mobile device is determined for the one of the plurality of component carriers configured for the control channel.

24. The non-transitory computer-readable medium of claim 23, wherein the mobile device determines a zero overhead assumption for each of the other of the plurality of components carriers not configured for the control channel.

25. An apparatus configured for wireless communication, the apparatus comprising: at least one processor; and a memory coupled to the at least one processor, wherein the at least one processor is configured:
to receive, by a mobile device, one or more configuration parameters, comprising one or more control channel parameters for configuration of a control channel for the mobile device, wherein the configuration of the control channel designates system resources to be occupied by the control channel, and wherein the one or more configuration parameters include an identification of a subset of the system resources to be occupied by the control channel that are to be excluded from a determination of a resource overhead assumption;
to determine, by the mobile device, the overhead assumption based, at least in part, on the one or more configuration parameters, wherein the configuration of the at least one processor to determine the overhead assumption includes configuration of the at least one processor to determine a set of resources associated with the control channel, the set of resources excluding the identified subset of the system resources, and wherein the one or more configuration parameters includes an identification of one of:
a localized control channel; and
a distributed control channel, wherein the overhead assumption is determined, at least in part, based on the identification; deriving; to derive a channel state indicator (CSI) index based on the overhead assumption; and to transmit the CSI index to a serving base station.

26. The apparatus of claim 25, wherein the one or more configuration parameters includes identification of at least one of a plurality of sets of resources designated for the control channel, wherein the overhead assumption is determined based on the identified at least one of the plurality of sets of resources.

27. The apparatus of claim 25, wherein the one or more configuration parameters includes identification of a search space type associated with a set of resources, wherein the overhead assumption is determined based on the set of resources associated with the identified search space type.

28. The apparatus of claim 27, wherein the search space type includes one of:
a common search space; and a mobile device-specific search space.

29. The apparatus of claim 25, wherein the one or more configuration parameters include a configuration of a plurality of CSI processes, wherein the configuration of the at least one processor to determine the overhead assumption is performed separately for each of the plurality of CSI processes.

30. The apparatus of claim 25, wherein CSI index includes a channel quality indicator (CQI) index and one or more of: a rank indicator and a precoding matrix indicator (PMI).

31. The apparatus of claim 25, further comprising configuration of the at least one processor: to receive, at the mobile device, carrier configuration information configuring one of a plurality of component carriers, used for communication by the mobile device, for the control channel, wherein the overhead assumption by the mobile device is determined for the one of the plurality of component carriers configured for the control channel.

32. The apparatus of claim 31, wherein the mobile device determines a zero overhead assumption for each of the other of the plurality of components carriers not configured for the control channel.

* * * * *